United States Patent
Arai et al.

(10) Patent No.: US 8,666,016 B2
(45) Date of Patent: Mar. 4, 2014

(54) FUEL EXCHANGE APPARATUS

(75) Inventors: Yutaka Arai, Hitachinaka (JP); Yuji Hosoda, Kasumigaura (JP); Ryoji Azumaishi, Hitachiota (JP); Yutaka Kometani, Hitachinaka (JP); Kunihiko Iwama, Hitachinaka (JP)

(73) Assignee: Hitachi-GE Nuclear Energy, Ltd., Ibaraki (JP)

( * ) Notice: Subject to any disclaimer, the term of this patent is extended or adjusted under 35 U.S.C. 154(b) by 532 days.

(21) Appl. No.: 11/952,156

(22) Filed: Dec. 7, 2007

(65) Prior Publication Data
US 2014/0023171 A1   Jan. 23, 2014

(30) Foreign Application Priority Data
Dec. 8, 2006 (JP) ................................. 2006-332489

(51) Int. Cl.
*G21C 19/00* (2006.01)
(52) U.S. Cl.
USPC ............................ 376/268; 376/261; 376/271
(58) Field of Classification Search
USPC .................................. 376/245, 249, 260–272
See application file for complete search history.

(56) References Cited

U.S. PATENT DOCUMENTS

| | | | | | |
|---|---|---|---|---|---|
| 4,279,699 | A | * | 7/1981 | Kuhn | 376/268 |
| 4,781,882 | A | * | 11/1988 | Salton et al. | 376/271 |
| 5,644,607 | A | * | 7/1997 | Iwama et al. | 376/268 |
| 6,629,568 | B2 | * | 10/2003 | Post et al. | 166/382 |
| 2003/0024710 | A1 | * | 2/2003 | Post et al. | 166/382 |
| 2010/0210181 | A1 | * | 8/2010 | Moehn et al. | 451/5 |

FOREIGN PATENT DOCUMENTS

| | | |
|---|---|---|
| JP | 52-151297 | 11/1977 |
| JP | 53-068392 | 6/1978 |
| JP | 63-53495 | 3/1988 |
| JP | 63-317798 | 12/1988 |
| JP | 02-268297 | 11/1990 |
| JP | 07-181288 | 7/1995 |
| JP | 2000-19289 | 1/2000 |
| JP | 2002-71879 | 3/2002 |
| JP | 2002-82193 | 3/2002 |
| JP | 2003-107188 | 4/2003 |
| JP | 2004-245728 | 9/2004 |
| JP | 2006-84178 | 3/2006 |

\* cited by examiner

*Primary Examiner* — Timothy A Brainard
(74) *Attorney, Agent, or Firm* — Antonelli, Terry, Stout & Kraus, LLP.

(57) ABSTRACT

A fuel exchange apparatus, comprising:
   a traveling carriage moving horizontally in one direction;
   a traversing carriage moving horizontally on the traveling carriage in a direction orthogonal to the one direction in which the traveling carriage moves; and
   a fuel holding unit attached to the traversing carriage, and including an telescopic tube enabling to extend and contract, a holding tool for holding a fuel assembly and releasing the held fuel assembly, and a lifter for raising and lowering the holding tool by winding and running out linear members for suspending and supporting the holding tool from the traversing carriage,
wherein the holding tool is selectively placed in a constrained state in which the holding tool is subject to a constraint by the telescopic tube and in a freely suspended state in which the holding tool is released from the constraint by the telescopic tube and freely suspended by the linear members.

12 Claims, 6 Drawing Sheets

FIG. 2A
FIG. 2B
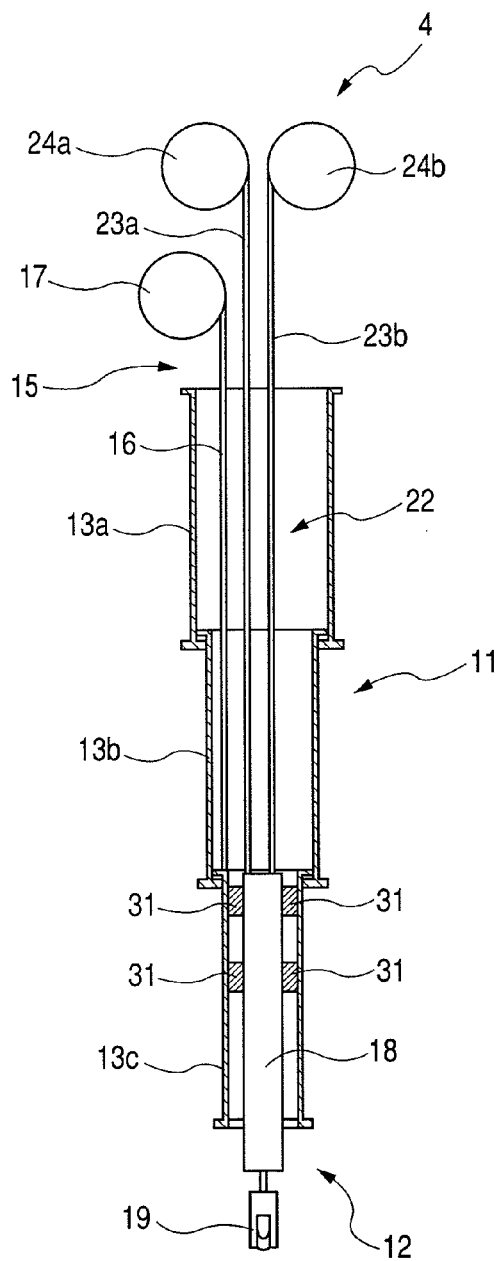
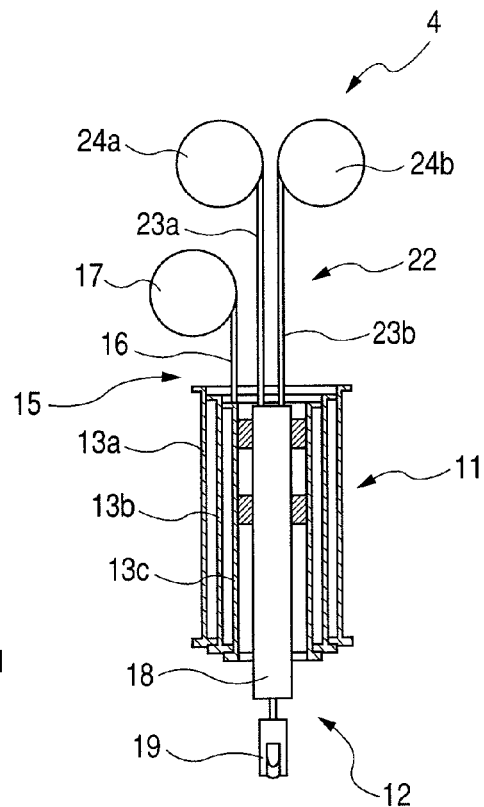

FIG. 6A
FIG. 6B
FIG. 6C
FIG. 6D
FIG. 6E
FIG. 6F
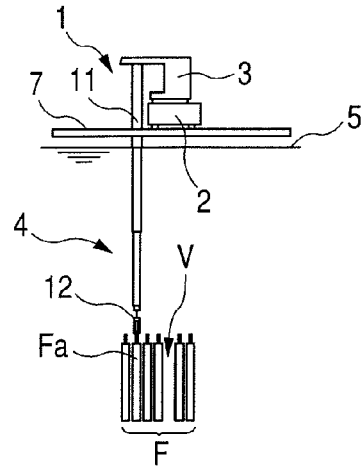
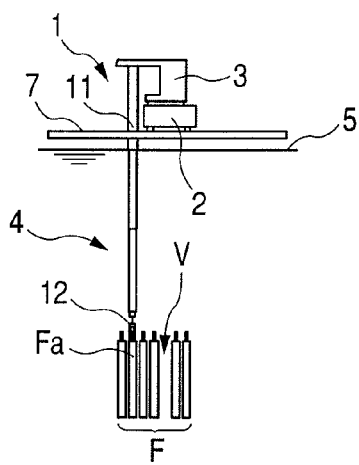
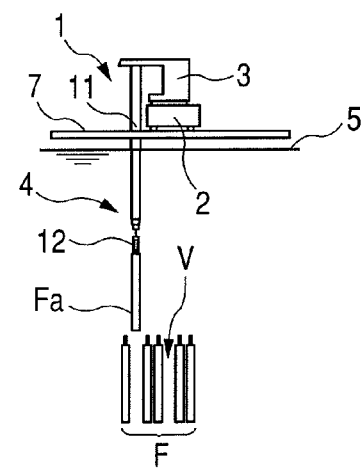
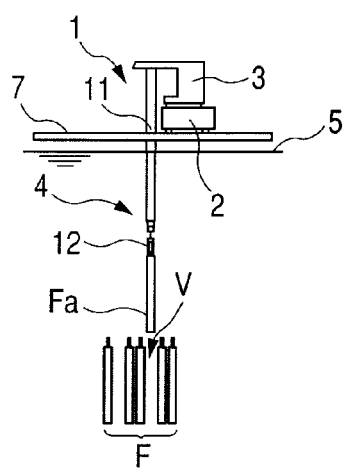
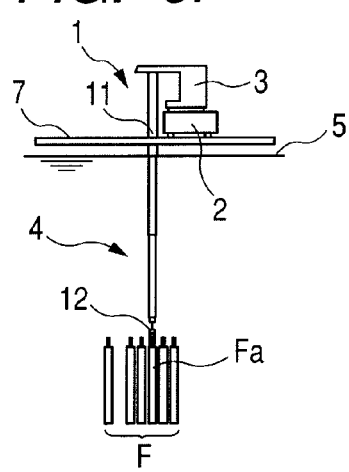

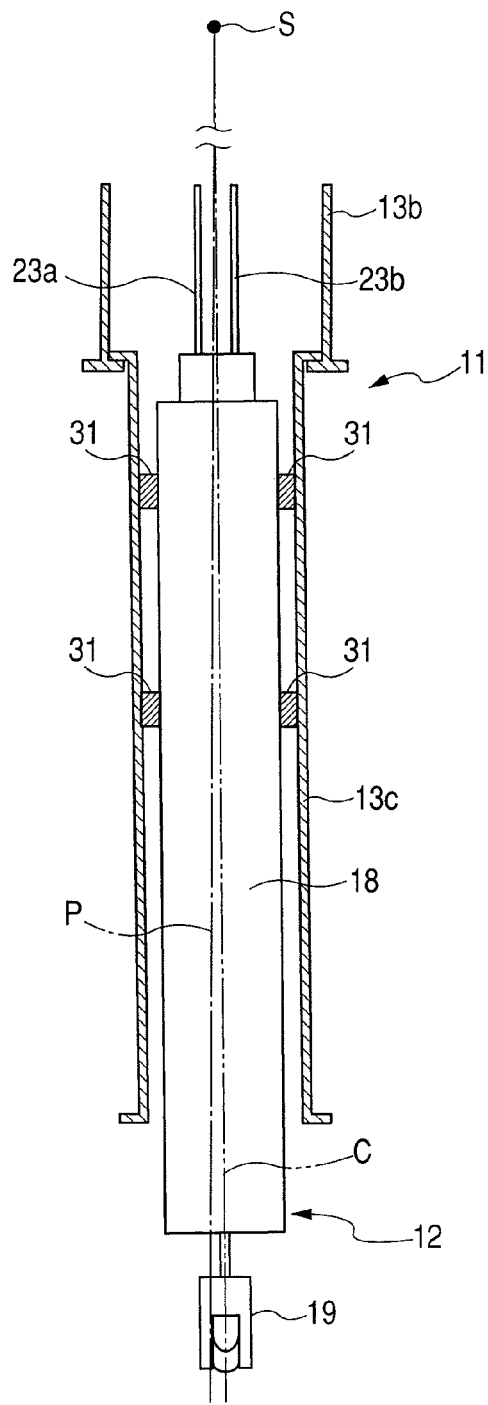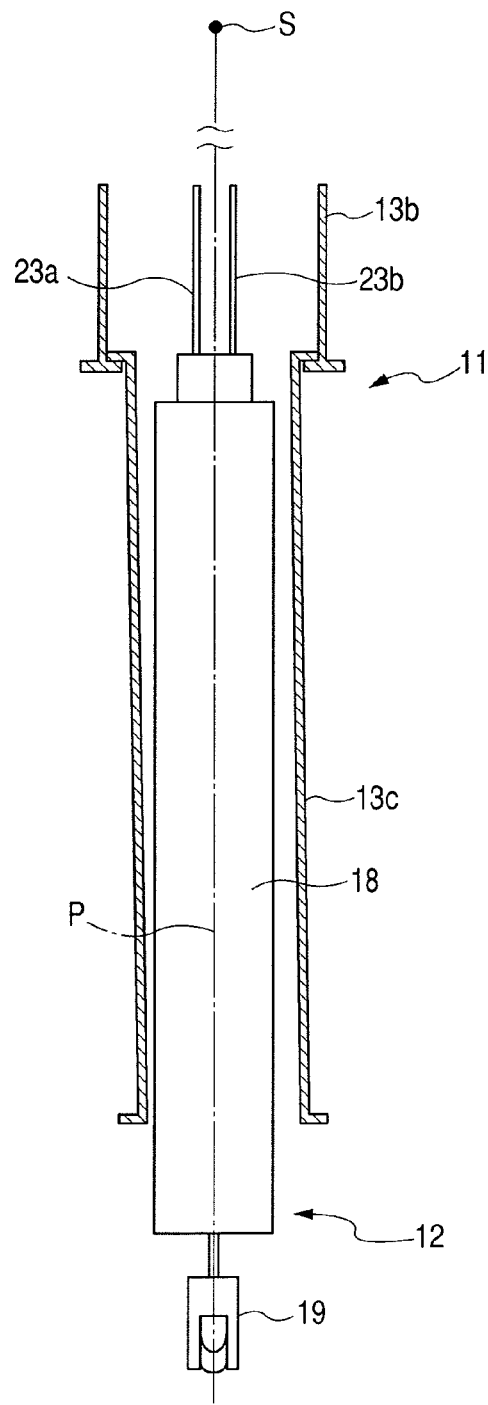

FUEL EXCHANGE APPARATUS

CLAIM OF PRIORITY

The present application claims priority from Japanese application serial no. 2006-332489, filed on Dec. 8, 2006, the content of which is hereby incorporated by reference into this application.

BACKGROUND OF THE INVENTION

The present invention relates to a fuel exchange apparatus used for fuel exchange in a nuclear reactor in a nuclear power station.

In the nuclear reactor of a nuclear power station, fuel, specifically, fuel assemblies in a nuclear reactor are exchanged in annual inspection being performed during shutdown of the nuclear reactor. In the fuel exchange operation, spent fuel assemblies are taken out of the nuclear reactor and transferred to a spent fuel storage pool and new fuel assemblies are loaded in the nuclear reactor. Further, the fuel assemblies in the core are shuffled, that is, repositioned so that the fuel assemblies can be evenly burned.

This fuel exchange operation is performed by using a fuel exchange apparatus. The fuel exchange apparatus has a traveling carriage being moved horizontally in one direction, a traversing carriage being moved horizontally on the traveling carriage in a direction orthogonal to the direction in which the traveling carriage moves, and a fuel holding unit attached to the traversing carriage. The fuel exchange apparatus is disposed so that it can move across the spent fuel storage pool and nuclear reactor well pool disposed above the nuclear reactor.

The fuel holding unit has an telescopic tube, a holding tool, and a lifter. The telescopic tube is provided so that when a fuel assembly held by the holding tool is moved in the water in the spent fuel storage pool and nuclear reactor well pool, the fuel assembly can withstand the resistance of the water. The telescopic tube is formed by telescopically assembling a plurality of metal pipes, called masts, having different diameters, so that the telescopic tube can extend and contract. The holding tool is structured so that it can hold and release a fuel assembly, and attached at a lower end of the telescopic tube. The lifter has wire ropes as linear members for suspending and supporting, and also includes winch as winding means for winding and running out the wire ropes. The winch is provided with the traversing carriage. The wire ropes are used to suspend and support the holding tool from the traversing carriage. When the wire ropes are wound or run out by the winches, the holding tool is raised or lowered, and the telescopic tube is contracted or extended in synchronization with the raising motion or the lowering motion of the holding tool.

The exchange and shuffle of the fuel assemblies in which the fuel exchange apparatus is used are performed as described above, by positioning the holding tool of the fuel holding unit at a necessary position by moving both the traveling carriage and traversing carriage. The operation for taking out the fuel assemblies from the nuclear reactor is performed, as described below in detail. First, a lid of the nuclear reactor is opened, and the fuel exchange apparatus is moved to a position above the nuclear reactor well pool by moving the traveling carriage. The holding tool of the fuel holding unit is then positioned right above a spent fuel assembly to be taken out by moving the traveling carriage and traversing carriage. The telescopic tube is extended at that position by running out the wire ropes from the winch, and the spent fuel assembly in the core is held by the holding tool. The telescopic tube is contracted by winding the wire ropes by the winch and the spent fuel assembly is taken out from the nuclear reactor. The fuel exchange apparatus holding the spent fuel assembly is moved from above the nuclear reactor well pool to above the spent fuel assembly storage pool. The spent fuel assembly is positioned right above any of the storage racks in the spent fuel assembly storage pool by moving the traveling carriage and traversing carriage. The telescopic tube is extended again at that position to lower and the spent fuel assembly is deposited in the storage rack. The spent fuel assembly is released from the holding tool and stored in the storage rack.

The shuffle of fuel assemblies is performed as described bellow in detail. The holding tool of the fuel holding unit is positioned right above a fuel assembly to be repositioned by moving the traveling carriage and traversing carriage. The telescopic tube is extended at that position and the fuel assembly in the core is held by the holding tool. The telescopic tube is then contracted and the fuel assembly is taken out from the loaded position. After the fuel assembly is positioned right above a destination position at which to load the fuel assembly by moving the traveling carriage and traversing carriage, the telescopic tube is extended again at that position to lower and the fuel assembly in deposited in the destination position in the core. The fuel assembly is released from the holding tool and loaded at the destination position.

Examples of this type of fuel exchange apparatus are disclosed in, for example, Japanese Patent Laid-open No. 2006-84178, Japanese Patent Laid-open No. 2004-245728, Japanese Patent Laid-open No. 2002-71879, Japanese Patent Laid-open No. 2002-82193 and Japanese Patent Laid-open No. 2000-19289.

SUMMARY OF THE INVENTION

A fuel exchange operation performed by a fuel exchange apparatus as described above is performed automatically in which the operation of the fuel exchange apparatus is remotely controlled. In this remote automatic operation, the position of the holding tool attached at the lower end of the telescopic tube is estimated from the positions of the traveling carriage and traversing carriage. Precision on the order of millimeters is thus required for the estimated position. Accordingly, sufficient stiffness and precision are demanded for the traveling carriage and traversing carriage as well as rails on which these carriages move and the telescopic tube of the fuel holding unit.

This demand for high stiffness and high precision is a large burden in terms of the cost of the fuel exchange apparatus. The telescopic tube, for example, is operated on the positioning of the holding tool in the vertical direction. During the vertical positioning of the holding tool, the amount by which the telescopic tube is extended is usually as long as ten-odd meters. When the reactor pressure vessel is deep, the telescopic tube is further extended. This type of telescopic tube, by which the position of the holding tool is determined, is required to have high straightness, that is, the state in which the central line of the telescopic tube matches the vertical line must be stably maintained even when telescopic tube is in ten-odd meters or more in length. Also the telescopic tube is required to stably maintain its high straightness during its repetition of extension and contraction. Accordingly, the demand for high stiffness and high precision for the telescopic tube especially expands. The telescopic tube thus needs to be fabricated by an extremely special machining method, resulting in a large cost burden and thus leading to a major factor in an increased fabricating cost of the fuel exchange apparatus.

In addition to the problem with the cost involved in fabricating the fuel exchange apparatus, which is raised by the demand for high stiffness and high precision for the telescopic tube, a conventional fuel exchange apparatus has another fabrication cost problem concerning an orientating mechanism for adjusting the orientations of the holding tool and the fuel assembly held by the holding tool. In fuel exchange and other operations, it is necessary to be rotated the holding tool around the vertical axis so as to adjust the orientations of the holding tool and the fuel assembly held by the holding tool. For this purpose, the conventional fuel exchange apparatus uses an orientating mechanism by which the holding tool is rotated together with the telescopic tube. The orientating mechanism is thereby enlarged, resulting in an increase in the weight of the fuel holding unit. The increase in the weight of the fuel holding unit also increases the load of the traveling carriage and traversing carriage, making it severer to meet the demand for high stiffness and high precision for the traveling carriage and traversing carriage as well as the rails on which these carriages move. Therefore, the cost involved in fabricating the fuel exchange apparatus is further increased.

An object of the present invention is to provide a fuel exchange apparatus having a fuel holding unit comprising an telescopic tube and a holding tool, with a reduced fabricating cost.

As described above, the problems with the cost of the fuel exchange apparatus are attributable to the demand for high stiffness and high precision, the demand for high stiffness and high precision particularly for the telescopic tube, and an orientating mechanism.

When addressing the problem with the cost attributable to the demand for high stiffness and high precision for the telescopic tube, the present invention employs the concept of allowing the precision of the telescopic tube, specifically, the straightness of the telescopic tube to be rough. The reason why the high stiffness and high precision are demanded for the telescopic tube is that when the holding tool is positioned with respect to, for example, a fuel assembly by moving the traveling carriage and traversing carriage, the holding tool is positioned by the telescopic tube in a state in which the telescopic tube constrains the holding tool with its high stiffness. In other words, the high stiffness and high precision are demanded for the telescopic tube because the position of the holding tool is estimated with reference to the telescopic tube constraining the holding tool and thereby the position of the holding tool is estimated on the premise that the telescopic tube has high straightness, its central axis is vertical, and the central axis of the holding tool matches the vertical central axis of the telescopic tube. If a structure is achieved in which the central axis of the holding tool does not need to match the central axis of the telescopic tube (which may or may not be vertical) while the holding tool is under a constraint by the telescopic tube, it becomes possible to lower the level of the demand for high stiffness and high precision for the telescopic tube. That is, the precision of the telescopic tube is allowed to be rough.

Next, a method of finally positioning the holding tool with high precision while the precision of the telescopic tube is allowed to be rough will be described. The holding tool is suspended freely, that is, placed in a freely suspended state in which the holding tool can freely receive the force of gravity, by releasing the holding tool from the constraint by the telescopic tube at a necessary time. The force of gravity in the free suspended state is used to have the central axis of the holding tool match the vertical axis (this vertical axis extends downward from a reference point used for the positioning of the holding tool by moving the traveling carriage and traversing carriage). This eliminates the need for the central axis of the holding tool to match the vertical axis when the holding tool is under the constraint by the telescopic tube. Accordingly, the precision of the telescopic tube is allowed to be rough.

The present invention solves the problems with the cost of the telescopic tube under the concept described above. Specifically, a fuel exchange apparatus according to the present invention has a traveling carriage moving horizontally in one direction; a traversing carriage moving horizontally on the traveling carriage in a direction orthogonal to the one direction in which the traveling carriage moves; and a fuel holding unit attached to the traversing carriage so that fuel assemblies in a nuclear reactor can be exchanged, and including an telescopic tube enabling to extend and contract, a holding tool formed so as to hold the fuel assembly and release the held fuel assembly, and a lifter for raising and lowering the holding tool by winding and running out linear members for suspending and supporting the holding tool from the traversing carriage, wherein the holding tool has a structure enabling to select in a constrained state in which the holding tool is subject to a constraint by the telescopic tube and in a freely suspended state in which the holding tool is released from the constraint by the telescopic tube and freely suspended by the linear members.

In this type of fuel exchange apparatus according to the present invention, when, for example, a spent fuel assembly is taken out of the nuclear reactor, the fuel holding unit is positioned right above the spent fuel assembly to be taken out in the nuclear reactor by moving the traveling carriage and traversing carriage with a reference point set to a support center in, for example, suspension and support of the telescopic tube by the traversing carriage, and then the telescopic tube is extended to lower the holding tool to a position at which it can hold the spent fuel assembly while the holding tool is kept in the constrained state. In this state, if the telescopic tube is not sufficiently straight, the central axis of the holding tool constrained by the non-straight telescopic tube does not match the vertical line from the reference point. If this state continues, the holding tool may fail to hold the spent fuel assembly. When the holding tool is shifted to the freely suspended state while the above state is maintained, the central axis of the holding tool can be made to match the vertical line due to the force of gravity in the freely suspended state and the holing tool can hold the spent fuel assembly. That is, the fuel exchange apparatus according to the present invention enables fuel assembly to be easily exchanged in a remote automatic operation even when the telescopic tube is not straight, thereby allowing the precision of the telescopic tube to be rough and solving the problem with the cost attributable to the demand for high stiffness and high precision for the telescopic tube.

In a preferred embodiment of the fuel exchange apparatus described above, a clamp mechanism is provided between the holding tool and the telescopic tube, and the constrained state and the freely suspended state can be selectively taken by operating the clamp mechanism. According to this embodiment, a simple mechanism can be used to change the holding tool between the constrained state and the freely suspended state.

Another preferred embodiment of the fuel exchange apparatus provides with the clamp mechanism having a clamp body disposed between the holding tool and the telescopic tube, and a clamp driving apparatus that selectively places the clamp body in a pressed state, in which the clamp body is pressed against the inner surface of the telescopic tube, and in a non-pressed state, in which the clamp body is away from the inner surface of the telescopic tube. This fuel exchange apparatus becomes the constrained state when the clamp body is in the pressed state, and becomes the freely suspended state when the clamp body is in the non-pressed state. According to this embodiment, the clamp mechanism can be simplified.

In another preferred embodiment, the clamp driving apparatus in the clamp mechanism in the above fuel exchange apparatus has a top formed in a cone shape, a screw member that vertically engages and passes through the top, and motor for driving the rotation of the screw member. Forward and backward motion of the top is caused in the vertical direction when the motor drives the rotation of the screw member, and the clamp body moves horizontally according to the forward and backward motion of the top, enabling the pressed state and the non-pressed state to be taken. According to this embodiment, the clamp mechanism can be simplified.

The above fuel exchange apparatus is preferably provided with a rotation preventing mechanism by which the holding tool is prevented from rotating around the vertical axis while the holding tool is in the freely suspended state. The orientation of the holding tool in the freely suspended state can then be adjusted with ease.

To address the problem with the cost attributable to the orientating mechanism, an orientating mechanism of a preferred embodiment rotates the holding tool independently of the telescopic tube so as to eliminate the need for rotation of the telescopic tube, which has a significantly larger mass than the holding tool. Accordingly, a factor that increases the cost is eliminated because the orientating mechanism of a preferred embodiment is simplified.

Specifically, a preferred fuel exchange apparatus according to the present invention has a traveling carriage moving horizontally in one direction; a traversing carriage moving horizontally on the traveling carriage in a direction orthogonal to the one direction in which the traveling carriage moves; and a fuel holding unit attached to the traversing carriage so that fuel assemblies in a nuclear reactor can be exchanged, and including an telescopic tube enabling to extend and contract, a holding tool formed so as to hold the fuel assembly and release the held fuel assembly, and a lifter for raising and lowering the holding tool by winding and running out linear members for suspending and supporting the holding tool from the traversing carriage, wherein the fuel holding unit includes a holding tool rotating mechanism for rotating the holding tool around the vertical axis relative to the telescopic tube.

With this type of fuel exchange apparatus, the holding tool rotating mechanism also functions as the orientating mechanism. The holding tool rotating mechanism rotates only the holding tool when the holding tool and a fuel assembly held by the holding tool are orientated. Accordingly, the holding tool rotating mechanism can be simplified, eliminating a factor that increases the cost.

According to the present invention, a fuel exchange apparatus having a fuel holding unit including an telescopic tube and a holding tool can be reduced its fabricating cost.

BRIEF DESCRIPTION OF THE DRAWINGS

FIGS. 2A and 2B are a longitudinal sectional views schematically showing a fuel holding unit of the fuel exchange apparatus shown in FIG. 1; FIG. 2A is an explanatory drawing showing the extended fuel holding unit; and FIG. 2B is an explanatory drawing showing the contracted fuel holding unit.

FIG. 3A is an explanatory drawing showing a freely suspended state of a holding tool and FIG. 3B is an explanatory drawing showing a constrained state of a holding tool.

FIGS. 6A to 6F are an explanatory drawings schematically showing shuffle operation of fuel assembly in the nuclear reactor.

FIG. 7A is an explanatory drawing showing a constrained state of a holding tool and FIG. 7B is an explanatory drawing showing a freely suspended state of a holding tool.

DETAILED DESCRIPTION OF THE PREFERRED EMBODIMENTS

Figure 1:
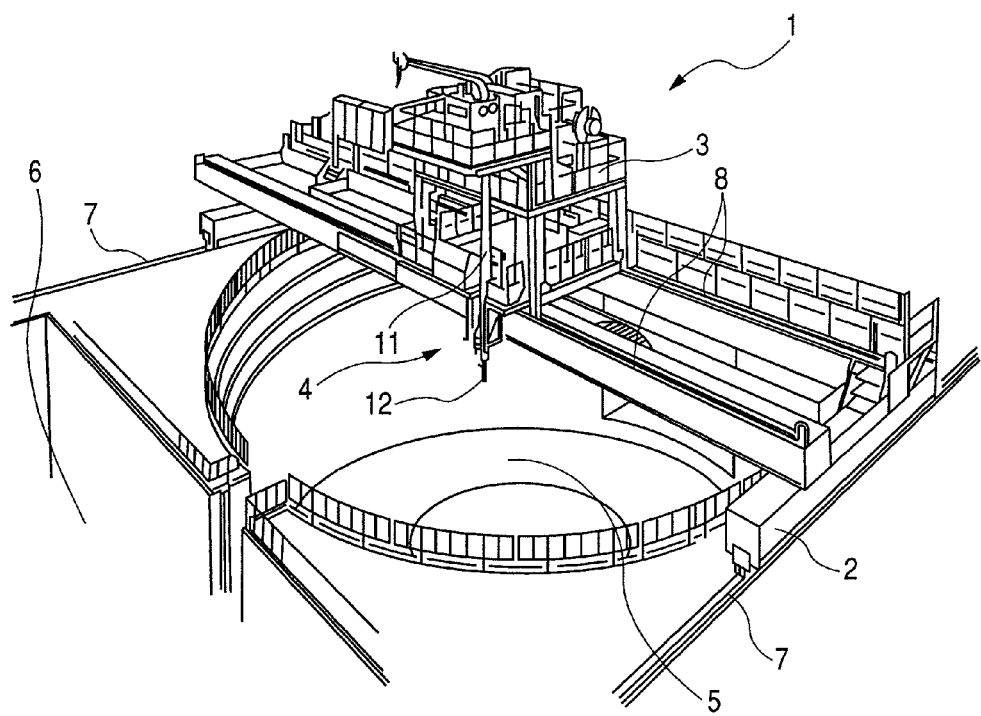
FIG. 1 is a perspective view showing an entire structure of a fuel exchange apparatus according to an embodiment.

A fuel exchange apparatus according to an embodiment of the present invention will be described below. FIG. 1 shows an entire structure of the fuel exchange apparatus according to the present embodiment. The fuel exchange apparatus 1 of the present embodiment is provided with a traveling carriage 2, a traversing carriage 3, and a fuel holding unit 4.

The traveling carriage 2 can horizontally move across a nuclear reactor well pool 5, which is filled with water so as to shield radioactive rays, and a spent fuel storage pool 6, which is disposed adjacent to the nuclear reactor well pool 5, on two traveling rails 7 disposed in parallel at both sides of the nuclear reactor well pool 5 and spent fuel storage pool 6. Therefore, the traveling carriage 2 can freely change its position in one direction (referred to below as the X direction) on a horizontal plane.

The traversing carriage 3 can move on two traversing rails 8, which are provided in parallel on the traveling carriage 2 and are orthogonal to the traveling rail 7. Thus, the traversing carriage 3 can freely change its position in the Y direction, which is orthogonal to the X direction, on a horizontal plane.

The fuel holding unit 4 has an telescopic tube 11 and a holding tool 12 and is suspended from the traversing carriage 3. The fuel holding unit 4 can be placed at any position on a horizontal plane above the nuclear reactor well pool 5 and the spent fuel storage pool 6 by a combination of the X-directional motion of the traveling carriage 2 and the Y-directional motion of the traversing carriage 3.

The telescopic tube 11 is extensibly structured by telescopically assembling a plurality of masts 13a, 13b, and 13c, which are metal pipes having different diameters that are smaller in sequence, as shown in FIGS. 2A and 2B. The telescopic tube 11 is suspended and supported at its upper end portion by the traversing carriage 3 through a suspending and supporting part (not shown). The telescopic tube 11 is extended and contracted by an operation unit 15. The operation unit 15 comprises a wire rope 16 being a linear members connected to the mast 13c positioning at the bottom of the telescopic tube 11, and a winch 17 adjusting the effective length of the wire rope 16 by winding and running out the wire rope 16. The telescopic tube 11 can be became a desired length by winding or running out the wire rope 16 by the winch 17. When the effective length of the wire rope 16 is maximized, the telescopic tube 11 is fully extended as shown in FIG. 2A. When the effective length of the wire rope 16 is minimized, the telescopic tube 11 is completely contracted as shown in FIG. 2B.

The holding tool 12 has a suspension member 18 and a holding tool body 19. The suspension member 18 is a clamp acceptor that receives a clamp action caused by a clamp mechanism 21 (see FIGS. 3A and 3B), as described later. For example, the holding tool 12 is structured in a cylindrical shape by using a metal pipe. The holding tool body 19 is structured so that it can hold a fuel assembly and releases the held fuel assembly, and is attached to a lower end portion of the suspension member 18.

The holding tool 12 is raised and lowered by a lifter 22. The lifter 22 has wire ropes 23a and 23b, which are linear members, and winches 24a and 24b that prolong and shorten the effective lengths of the wire ropes 23a and 23b by winding and running out the wire ropes 23a and 23b. The wire ropes 23a and 23b suspend and support the suspension member 18. Accordingly, the holding tool 12 can be positioned at a desired position by winding or running out the wire ropes 23a and 23b. When the effective lengths of the wire ropes 23a and 23b are maximized, the holding tool 12 is lowered to the lowest position as shown in FIG. 2A. When the effective lengths of the wire ropes 23a and 23b are minimized, the holding tool 12 are raised to the highest position as shown in FIG. 2B. When the holding tool 12 is suspended and supported by the wire ropes 23a and 23b, the center of the suspension and support matches the center of the suspension and support of the telescopic tube 11 by the traversing carriage 3. The holding tool 12 is raised and lowered in synchronization with the extension and contraction of the telescopic tube 11. That is, the winch 17 and the winches 24a and 24b always perform winding and running out on the same timing and at the same speed.

Figure 3A:
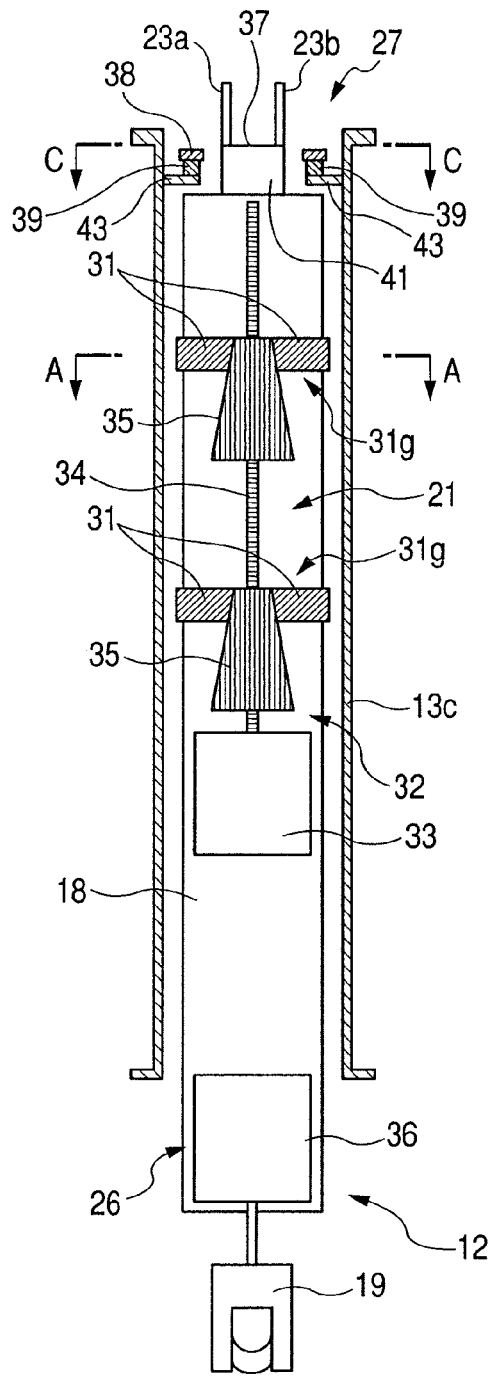
FIGS. 3A and 3B are a longitudinal sectional views schematically showing a lower portion of a telescopic tube.
Figure 3B:
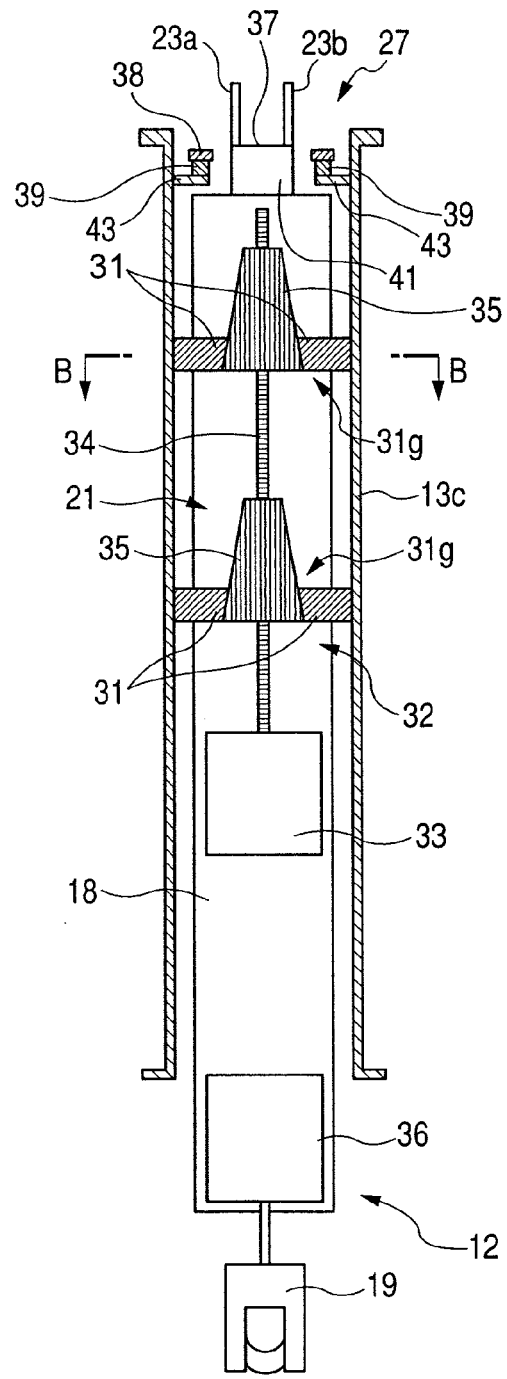

The holding tool 12 can be selected the constrained state and the freely suspended state by the clamp mechanism 21, as shown in FIGS. 3A and 3B. The holding tool 12 can also rotate the holding tool body 19 around the vertical axis relative to the telescopic tube 11 by a holding tool rotating mechanism 26. When the holding tool 12 is in the freely suspended state, its free rotation around the vertical axis can be prevented by a rotation preventing mechanism 27 shown in FIG. 5. In the constrained state, the holding tool 12 is constrained by the mast 13c of the telescopic tube 11. In the freely suspended state, the holding tool 12 is released from the constraint by the mast 13c and freely suspended by the wire ropes 23a and 23b. The clamp mechanism 21, holding tool rotating mechanism 26, and rotation preventing mechanism 27 will be described below in that order.

Figure 4A:
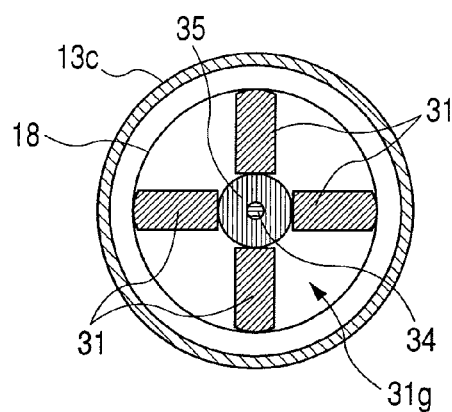
FIG. 4A is a sectional view taken along a line A-A of FIG. 3A
Figure 4B:
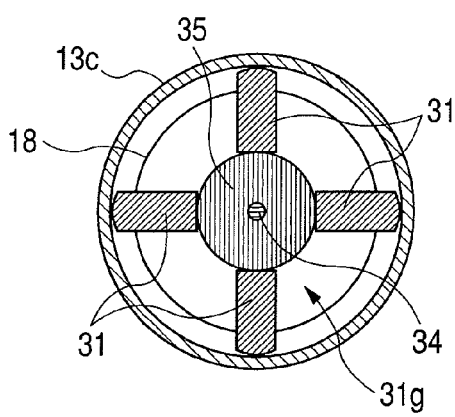
FIG. 4B is a sectional view taken along a line B-B of FIG. 3B.

First, the clamp mechanism 21 will be described. The clamp mechanism 21 has a plurality of clamp brackets 31 and a clamp driving apparatus 32 for driving the clamp brackets 31, as shown in FIGS. 3A, 3B, 4A and 4B. FIGS. 3A and 3B schematically show the vertical cross section of the main part of the fuel holding unit. FIG. 4A shows section A-A in FIG. 3A, and FIG. 4B shows section B-B in FIG. 3B.

The clamp member 31 is a clamp body, which is formed in a block shape by using, for example, a metal material or the like. The clamp member 31 is disposed between the suspension member 18 of the holding tool 12 and the mast 13c of the telescopic tube 11. Specifically, the clamp members 31, which is disposed so that it passes through the suspension member 18 in the horizontal direction, are moved forward and backward by a driving force (described later) generated by the clamp driving mechanism 32 in a radial direction of the suspension member 18 while being guided by a guiding member (not shown). The clamp members 31 are selectively placed in the pressed state (see FIG. 3B) in which the clamp members 31 are pressed against the inner surface of the mast 13c and in the non-pressed state (see FIG. 3A) in which the clamp members 31 are away from the inner surface of the mast 13c due to the forward and backward motion. In addition, the clamp members 31 are always biased by a biasing apparatus (not shown), such as a spring, in a direction in which the clamp members 31 go away from the inner surface of the mast 13c. In the example shown in FIGS. 3A, 3B, 4A and 4B, eight clamp members 31 of this type are provided. Each four of the clamp members 31 are radially disposed on the same horizontal plane, forming a clamp group 31g. That is, the eight clamp brackets 31 are disposed so that two clamp groups 31g are formed.

The clamp driving mechanism 32 includes a driving motor 33 fixed to the inside of the suspension member 18, a ball screw 34, which is a screw member connected to the rotation axis of the driving motor 33, and a top 35 engaged with the ball screw 34. The top 35 has a cone shape such as a truncated pyramid or truncated cone, and is provided for each of the two clamp groups 31g. The four radially disposed clamp members 31 of the clamp group 31g are each pressed against the surface of the cone by the bias force of the above biasing apparatus.

When the ball screw 34 is rotated by the driving motor 33, the top 35 moves forward (raised) or backward (lowered) in the vertical direction. When the top 35 is raided, each clamp member 31 in the two clamp groups 31g is pressed by the cone surface of the top 35 and moves forward in a radial direction of the suspension member 18, toward the inner surface of the mast 13c. The each clamp member 31 then enters the pressed state, in which it is pressed against the inner surface of the mast 13c. Due to this pressed state, the holding tool 12 enters the constrained state, in which it is constrained by the mast 13c of the telescopic tube 11 and the clamp members 31. When the top 35 is lowered, the pressing force by the cone surface of the top 35 is eliminated, each clamp member 31 in the two clamp groups 31g moves backward in a radial direction of the suspension member 18 due to the bias force of the biasing apparatus, and enters the non-pressed state, in which it is away from the inner surface of the mast 13c. Due to this non-pressed state, the holding tool 12 is released from the constraint by the mast 13c of the telescopic tube 11 and the clamp members 31 and enters the freely suspended state in which it is freely suspended by the wire ropes 23a and 23b. The operation of this clamp mechanism 21 is preferably performed at a speed at which the holding tool 12 is not exposed to vibration.

Next, the holding tool rotating mechanism 26 will be described. The holding tool rotating mechanism 26 is an orientating mechanism that functions to have the holding tool 12 perform orientation necessary for the holding tool 12 to hold a fuel assembly and release the held fuel assembly. The holding tool rotating mechanism 26 rotates the holding tool body 19 of the holding tool 12 around the vertical axis, relative to the telescopic tube 11. That is, the holding tool rotating mechanism 26 is structured so that it can rotate the holding tool body 19 by itself around the vertical axis. Specifically, the holding tool body 19 is connected to the rotation axis of a holding tool rotating motor 36 fixed inside the suspension member 18. In this holding tool rotating mechanism 26, the holding tool body 19 can be rotated around the vertical axis by operating the holding tool rotating motor 36, and thereby the orientation of the holding tool body 19 and that of the fuel assembly held by the holding tool body 19 can be freely adjusted. That is, it can be freely performed to have the orientation of the holding tool body 19 match the orientation of the handle of a fuel assembly to be held, or have the orientation of the fuel assembly held by the holding tool body 19 suit, for example, a storage rack in the spent fuel assembly storage pool.

As described above, the holding tool rotating mechanism 26 can achieve orientation necessary to hold a fuel assembly and release the held fuel assembly just by rotating the holding tool body 19 by itself. Accordingly, the size of the holding tool rotating mechanism 26 can be greatly reduced, as compared with a conventional orientating mechanism that rotates the entire telescopic tube 11 to achieve orientation, thereby making it possible to reduce the weight of the entire fuel exchange apparatus.

Figure 5:
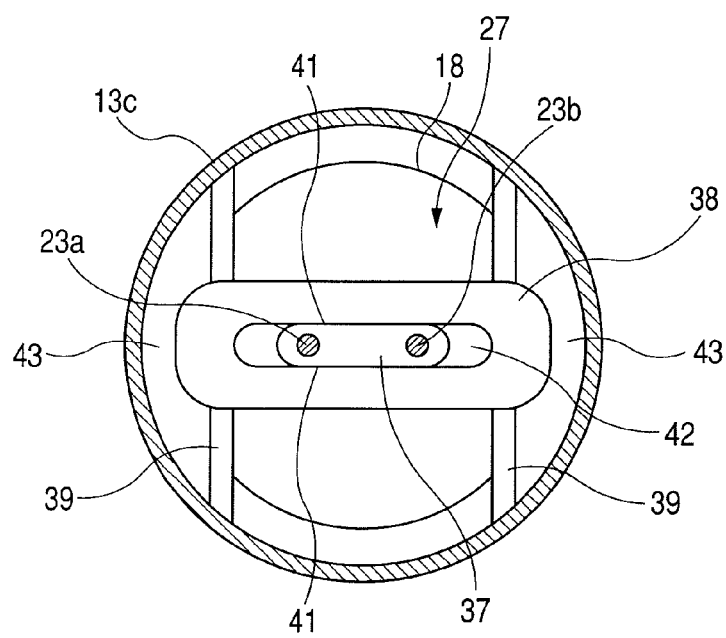
FIG. 5 is a sectional view taken along a line C-C of FIG. 3A.

The rotation preventing mechanism 27 will be described. The rotation preventing mechanism 27 prevents the holding tool 12 in the freely suspended state from freely rotating around the vertical axis by means of the telescopic tube 11, and functions to allow the holding tool 12 to horizontally swing relative to the telescopic tube 11 so as to assure the freely suspended state of the holding tool 12. This rotation preventing mechanism 27 is disposed at an upper end portion of the holding tool 12, that is, an upper end of the suspension member 18, as shown in FIGS. 3A and 3B and FIG. 5. The rotation preventing mechanism 27 includes a wire rope connecting member 37, a rotation constraining plate 38, and guides 39. FIG. 5 shows section C-C in FIG. 3A, as viewed in the direction indicated by the arrows in FIG. 3A.

The wire rope connecting member 37 is a linear member connecting part to which the wire rope 23, which is also a linear member for suspending and supporting the holding tool 12, is connected. The wire rope connecting member 37, which is formed in a block shape and has sliding contact surfaces 41 at both sides, is fixed to the upper end of the suspension member 18.

The rotation constraining plate 38 constrains the wire rope connecting member 37 from freely rotating around the vertical axis. The rotation constraining plate 38 is shaped into a rectangular plate, and has an elongated fitting hole 42. The wire rope connecting member 37 is fitted into the elongated fitting hole 42 while its sliding contact surfaces 41 are slid in contact with the fitting hole 42. After the wire rope connecting member 37 has been fitted, the rotation constraining plate 38 constrains the wire rope connecting member 37 from freely rotating around the vertical axis. However, the wire rope connecting member 37 can be freely displaced linearly in one direction (the longitudinal direction of the fitting hole 42, which is the horizontal direction in FIG. 5). This free linear displacement allows the telescopic tube 11 of the holding tool 12 to cause a relative, horizontal swing in one direction.

Two guides 39, formed in a block shape, are disposed so that they face each other, each of which is fixed to the mast 13c through a rib 43 attached on the mast 13c. These guides 39 guide and support the rotation constraining plate 38 so that only linear displacement is possible in another direction (the vertical direction in FIG. 5). That is, due to the guides 39, the rotation constraining plate 38 allows free linear displacement only in a direction orthogonal to the free displacement direction in the rotation constraining plate 38. This free linear displacement allows the telescopic tube 11 of the holding tool 12 to cause a relative, horizontal swing in another direction.

As described above, the rotation preventing mechanism 27 assures the freely suspended state for the holding tool 12 by allowing the holding tool 12 to swing horizontally, and also prevents the holding tool 12 from freely rotating around the vertical axis while being freely suspended. Accordingly, when the holding tool body 19 is oriented by the holding tool rotating mechanism 26 with the central axis of the holding tool 12 matching the vertical axis by using the force of gravity in the freely suspended state, as described later, the orientation can be performed with high precision.

An example of a fuel exchange operation performed by the fuel exchange apparatus 1 described above will be described below. FIGS. 6A to 6F illustrate a sequence of operations by the fuel exchange apparatus 1 in time series when a fuel assembly in the nuclear reactor is shuffled. Specifically, when a particular fuel assembly Fa is taken out of a plurality of fuel assemblies F loaded in the nuclear reactor and the fuel assembly Fa is reloaded into a destination V where no fuel assembly is loaded.

FIG. 6A illustrates a state before the operation is started. At this point in time, the fuel exchange apparatus 1 has not yet positioned the fuel holding unit 12 of the fuel holding unit 4 for the fuel assembly Fa, and the holding tool 12 is constrained by the telescopic tube 11 through the clamp mechanism 21 shown in FIGS. 3A and 3B.

When the operation starts, the fuel exchange apparatus 1 first moves the traveling carriage 2 and traversing carriage 3 to position the holding tool 12 in the horizontal direction. Thus, the holding tool 12 is positioned right above the target fuel assembly Fa. At the same time, the fuel exchange apparatus 1 extends the telescopic tube 11 so that the holding tool 12 is positioned close above the fuel assembly Fa. The holding tool rotating mechanism 26 shown in FIGS. 3A and 3B is operated, as necessary, to rotate the holding tool 12 so that its orientation matches the orientation of the fuel assembly Fa. In this case, since being constrained by the telescopic tube 11 through the clamp mechanism 27, the suspension member 18 shown in FIGS. 3A and 3B does not rotate, and only the holding tool 12 rotates. This state is illustrated in FIG. 6B. When the holding tool 12 is positioned horizontally by moving the traveling carriage 2 and traversing carriage 3, as described above, the position of the traversing carriage 3 is controlled by setting a reference point to, for example, the central point at an upper end of the telescopic tube 11 (the central point is also the center of the support of the telescopic tube 11 by the traversing carriage 3). More specifically, during the horizontal positioning, the position of the traversing carriage 3 is controlled so that the vertical line from the central point at the upper end of the telescopic tube 11 is brought immediately above the fuel assembly Fa.

With the holding tool 12 horizontally positioned as described above, the straightness of the telescopic tube 11 may not be sufficiently high. In this case, as shown in FIG. 7A, the central point at the upper end of the telescopic tube 11, that is, a reference point S in the horizontal positioning of the holding tool 12 has been positioned right above the fuel assembly Fa. However, the holding tool 12 is constrained by the telescopic tube 11, which is not straight, and thus central axis C of the holding tool 12 is not right above the fuel assembly Fa. That is, the central axis C of the holding tool 12 does not match the vertical line P from the reference point S. If an attempt is made to hold the fuel assembly Fa in this state, the attempt may fail.

Therefore, before the fuel assembly Fa is held by the holding tool 12, the clamp mechanism 21 is operated to release the holding tool 12 from the constraint by the telescopic tube 11 and place it in the freely suspended state. When the clamp mechanism 21 in FIGS. 3A and 3B is operated in the state in FIG. 7A so as to place the holding tool 12 in the freely suspended state, the state in FIG. 7B is obtained. That is, as described above, the center for the support and suspension of the holding tool 12 is matched with the center of the support and suspension of the telescopic tube 11 by the traversing carriage 3, that is, the reference point S. Due to the force of gravity, the central axis C of the telescopic tube 11 matches the vertical line P. Accordingly, even when the telescopic tube 11 is not sufficiently straight, the holding tool 12 can be finally placed at a position where the holding tool 12 can easily hold the fuel assembly Fa.

After the holding tool 12 has been placed with high precision at the final position in the horizontal direction, the telescopic tube 11 is further extended, the holding tool 12 is lowered to a position at which the holding tool 12 can hold the handle of the fuel assembly Fa, and the holding tool 12 holds the fuel assembly Fa, as shown in FIG. 6C, while the holding tool 12 is left in the freely suspended state.

After the holding tool 12 has held the fuel assembly Fa, the telescopic tube 11 is contracted and the holding tool 12 is raised while the holding tool 12 is left in the freely suspended state, so as to pull out the fuel assembly Fa from its loaded position. The amount by which the telescopic tube 11 is contracted and the amount by which the holding tool 12 is raised is within a minimum range necessary for completely pulling out the fuel assembly Fa from the loaded position. Upon the completion of pulling out the fuel assembly Fa, the clamp mechanism 21 shown in FIGS. 3A and 3B is operated to place the holding tool 12 in the constrained state. The holding tool rotating mechanism 26 shown in FIGS. 3A and 3B is then operated, as necessary, to adjust the orientation of the fuel assembly Fa held by the holding tool 12 so that the orientation of the fuel assembly Fa matches the correct insertion direction at the destination V to which to move the holding tool 12. The state at this point in time is shown in FIG. 6D.

The traveling carriage 2 and traversing carriage 3 then are moved to position the fuel assembly held by the holding tool 12 in horizontal direction. Therefore, this fuel assembly Fa is positioned right above the destination V. The movement of the fuel exchange apparatus 1 then is stopped until vibration caused in the fuel assembly Fa during the positioning subsides. After the vibration of the fuel assembly Fa subsided, the holding tool 12 is placed again in the freely suspended state. The fuel assembly Fa is held by the holding tool 12 in a state in which the fuel assembly Fa can freely rotate relative to the holding tool 12. The fuel assembly Fa has a cross section that is approximately square, and is symmetrically balanced in weight. Accordingly, the central axis of the fuel assembly Fa held by the holding tool 12 matches the vertical line in the same way as when the central axis of the holding tool 12 in the freely suspended state matches the vertical line as described above. As a result, the fuel assembly Fa is finally positioned at the destination V with high precision. The state at this point in time is shown in FIG. 6E.

After the fuel assembly Fa has been finally positioned at the destination V, the telescopic tube 11 is extended and the holding tool 12 is lowered while the holding tool 12 is left in the freely suspended state, so as to insert and load the fuel assembly Fa into the destination V. The state at this point in time is shown in FIG. 6F.

Accordingly, even when the telescopic tube 11 is not sufficiently straight because, for example, it is curved, the fuel exchange apparatus 1 enables a fuel assembly to be easily exchanged in a remote automatic operation. The telescopic tube 11 is thus allowed to be rough in precision, and the level of the demand for stiffness and precision of the telescopic tube 11 can be lowered correspondingly, making it possible to reduce the cost.

An embodiment that practices the present invention has been described. However, it is just a typical example. The present invention can be implemented in various modes within a range that does not depart from the purpose of the present invention. For example, although the structure in the above embodiment has an arrangement in which the holding tool 12 selectively takes the constrained state and the freely suspended state and another arrangement in which the holding tool rotating mechanism 26 rotates the holding tool 12 by itself so as to orientate it, the structure can have only either of these arrangements. In addition, the operation unit 15 provided so as to extend and contract the telescopic tube 11 is not necessarily needed; it can be eliminated. If the operation unit 15 is eliminated, the telescopic tube 11 is extended and contracted, for example, when the holding tool 12 is raised or lowered by the lift 22.

What is claimed is:

1. A fuel exchange apparatus, comprising:
a traveling carriage moving horizontally in one direction;
a traversing carriage moving horizontally on said traveling carriage in a direction orthogonal to the one direction in which said traveling carriage moves; and
a nuclear fuel holding unit attached to said traversing carriage, and including a telescopic tube having telescopic portions which extend and contract with respect to one another, a holding tool which holds a nuclear fuel assembly and which enables release of said held nuclear fuel assembly, and a lifter for raising and lowering said holding tool which holds and releases the nuclear fuel assembly by winding and running out linear members for suspending and supporting the holding tool from said traversing carriage;
wherein said holding tool has a clamp mechanism that is selectively placed in a constrained state in which said holding tool is subject to a constraint by said clamp mechanism pressed on an inner surface of said telescopic tube and in a freely suspended state in which said holding tool is released from the constraint by said clamp mechanism which is kept away from the inner surface of said telescopic tube and is freely suspended by said linear members;
wherein said clamp mechanism has at least one clamp body disposed in said holding tool, and a clamp driving apparatus for placing selectively said at least one clamp body in a pressed state, in which said at least one clamp body is pressed against the inner surface of said telescopic tube, and the freely suspended state which is a non-pressed state, in which said at least one clamp body is away from said inner surface, so that said holding tool is in said constrained state when said at least one clamp body is in said pressed state, and is in said freely suspended state when said at least one clamp body is in said non-pressed state;
wherein said clamp driving apparatus has at least one top formed in a cone shape, a screw member vertically passed through and engaged with said at least one top, and a motor for rotating said screw member; and
wherein forward and backward motion of said at least one top caused in the vertical direction by rotating said screw member by said motor moves horizontally said at least one clamp body in order to generate said pressed state and said non-pressed state.

2. The fuel exchange apparatus according to claim 1, further comprising:
a rotation preventing mechanism for preventing rotation of said holding tool around a vertical axis thereof and for allowing movement of said holding tool in a horizontal direction when said holding tool is in said freely suspended state.

3. The fuel exchange apparatus according to claim 1, wherein said holding tool has a suspension member connected to said linear members and disposed in said telescopic tube, and a holding tool body, which is attached to a lower end portion of said suspension member, for holding said fuel assembly and for releasing said held fuel assembly; and wherein said suspension member has a holding tool rotating mechanism for rotating said holding tool around a vertical axis relative to said telescopic tube; and wherein said clamp mechanism is installed in said suspension member and disposed in said telescopic tube.

4. The fuel exchange apparatus according to claim 1, wherein said clamp mechanism is pressed in a transverse direction relative to an axial direction of said telescopic tube on the inner surface of said telescopic tube.

5. The fuel exchange apparatus according to claim 4, wherein said clamp mechanism is pressed in the transverse direction which is a direction perpendicular relative to the axial direction of said telescopic tube.

6. The fuel exchange apparatus according to claim 1, wherein the said holding tool enables holding and releasing of said fuel assembly of a nuclear reactor.

7. The fuel exchange apparatus according to claim 6, wherein said telescopic tube is suspended and supported by a linear member from said traversing carriage which enables extension and contraction of said telescopic tube.

8. The fuel exchange apparatus according to claim 7, wherein said holding tool is enabled to be placed with precision at a final position in the horizontal direction so as to engage and hold and thereafter release said fuel assembly of said nuclear reactor when said holding tool is placed in a freely suspended state in which said holding tool is released from the constraint by said clamp mechanism which is kept away from the inner surface of said telescopic tube and is freely suspended by said linear members even when telescopic portions of said telescopic tube do not extend in parallel to one another.

9. The fuel exchange apparatus according to claim 8, wherein when said holding tool is placed in the constrained state in which said holding tool is subjected to constraint by said clamp mechanism pressed on the inner surface of said telescopic tube, vibration caused in said fuel assembly by moving of said fuel assembly in the horizontal direction is suppressed.

10. A fuel exchange apparatus, comprising:
a traveling carriage moving horizontally in one direction;
a traversing carriage moving horizontally on said traveling carriage in a direction orthogonal to the one direction in which said traveling carriage moves; and
a nuclear fuel holding unit attached to said traversing carriage, and including a telescopic tube having telescopic portions which extend and contract with respect to one another, a holding tool which holds a nuclear fuel assembly and which enables release of said held nuclear fuel assembly, and a lifter for raising and lowering said holding tool which holds and releases the nuclear fuel assembly by winding and running out linear members for suspending and supporting the holding tool from said traversing carriage;

wherein said holding tool has a clamp mechanism that is selectively placed in a constrained state in which said holding tool is subject to a constraint by said clamp mechanism pressed on an inner surface of said telescopic tube and in a freely suspended state in which said holding tool is released from the constraint by said clamp mechanism which is kept away from the inner surface of said telescopic tube and is freely suspended by said linear members;

wherein said clamp mechanism has at least one clamp body disposed in said holding tool, and a clamp driving apparatus for placing selectively said at least one clamp body in a pressed state, in which said at least one clamp body is pressed against the inner surface of said telescopic tube, and the freely suspended state which is a non-pressed state, in which said at least one clamp body is away from said inner surface, so that said holding tool is in said constrained state when said at least one clamp body is in said pressed state, and is in said freely suspended state when said at least one clamp body is in said non-pressed state; and wherein said clamp mechanism has first and second clamp bodies disposed in parallel in said holding tool, said clamp driving apparatus selectively placing said first and second clamp bodies in the pressed state, in which said first and second clamp bodies are pressed against the inner surface of said telescopic tube, and the freely suspended state which is a non-pressed state, in which said first and second clamp bodies are positioned away from said inner surface of said telescopic tube, so that said holding tool is in said constrained state when said first and second clamp bodies is in said pressed state, and is in said freely suspended state when said first and second clamp bodies are in said non-pressed state.

11. The fuel exchange apparatus according to claim 10, wherein said clamp driving apparatus has a first top formed in a cone shape and a second top formed in a cone shape for respective coactions with said first and second clamp bodies, and a screw member vertically passed through and engaged with said first and second tops, and a motor for rotating said screw member, and forward and backward motion of said first and second tops caused in the vertical direction by rotating said screw member by said motor moves horizontally said first and second bodies in order to generate the pressed state and the non-pressed state.

12. The fuel exchange apparatus according to claim 11, wherein the fuel exchange apparatus is a nuclear fuel exchange apparatus, said fuel holding unit is a nuclear fuel holding unit attached to said traversing carriage and including a telescopic tube having telescopic portions which extend and contract with respect to one another, said holding tool holding a nuclear fuel assembly and enabling release of said held nuclear fuel assembly, and a lifter for raising and lowering said holding tool which holds and releases said nuclear fuel assembly by winding and running out linear members for suspending and supporting the holding tool from said traversing carriage.

* * * * *